UNITED STATES PATENT OFFICE.

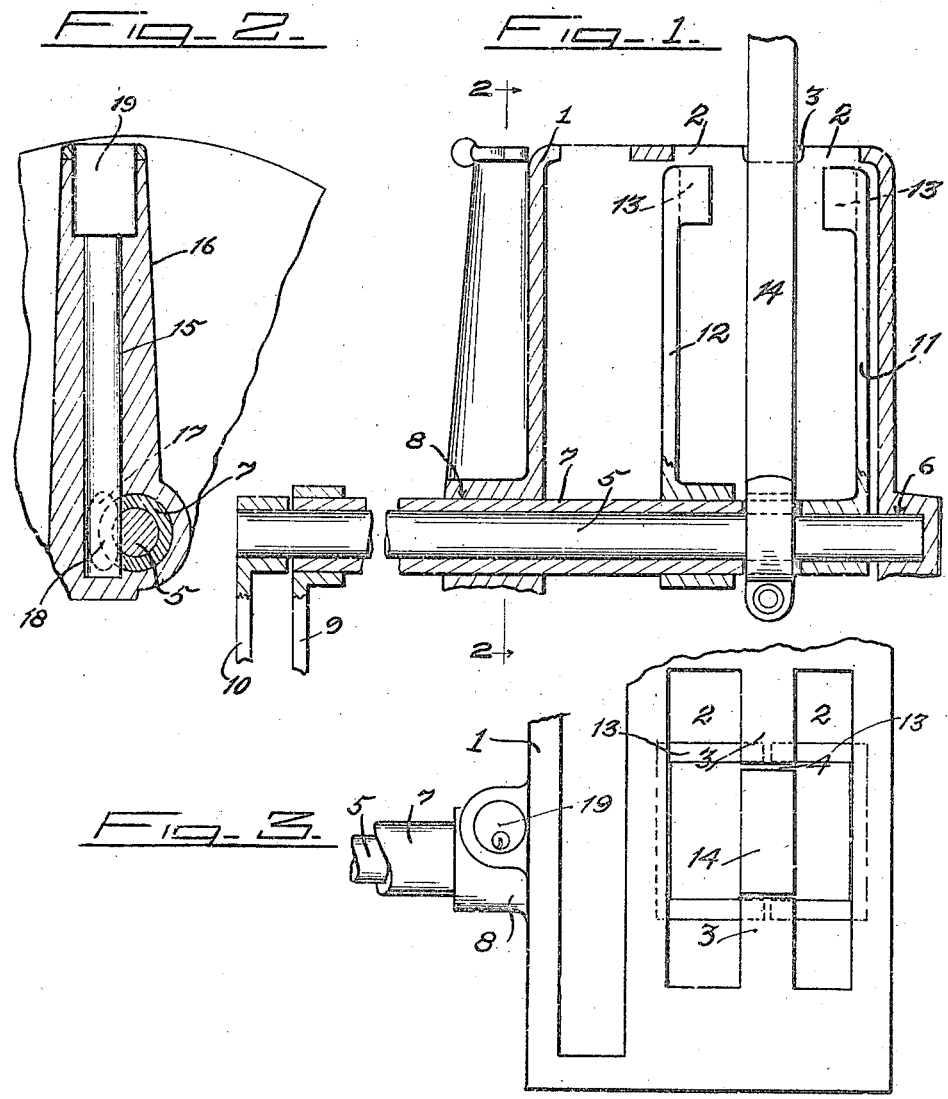

GEORGE C. JENSEN, OF OAKLAND, CALIFORNIA.

LEVER-LOCKING APPARATUS.

1,248,126.

Specification of Letters Patent.

Patented Nov. 27, 1917.

Application filed September 27, 1917. Serial No. 193,404.

*To all whom it may concern:*

Be it known that I, GEORGE C. JENSEN, a citizen of the United States, residing at Oakland, in the county of Alameda and State of California, have invented certain new and useful Improvements in Lever-Locking Apparatus, of which the following is a specification.

This invention relates to lever locking mechanism, and particularly to a type designed for employment in connection with the levers used in shifting the variable speed power transmitting mechanism of a motor driven vehicle.

The principal objects of the invention are to provide a construction particularly designed for locking the lever from movement when the same is employed in connection with lever engaging forks, capable of operating concentrically disposed members connected with the gear element; to provide a construction which may be manufactured at little cost, one containing but few parts and one which is capable of being added at little cost to units now in use.

To more fully comprehend the invention, reference is directed to the accompanying drawings, wherein—

Figure 1 is a view in transverse section of the preferred embodiment of my invention.

Fig. 2 is a vertical sectional view taken on line 2—2 of Fig. 1.

Fig. 3 is a view in plan of the disclosure in Fig. 1.

Referring more particularly to the several views of the drawings wherein like characters of reference designate corresponding parts, 1 indicates a suitable housing formed in its upper wall with the parallel guide slots 2 separated by the fingers 3, the meeting ends of which lie in spaced relation as at 4, Fig. 3 of the drawings. The shaft 5 extends transversely of the housing 2, it being rotatably mounted at one end in a bearing 6 therein and carries at its opposite end a concentrically disposed sleeve 7 which passes through a bearing 8 in the opposite side of the housing 2, the sleeve and shaft being rotatably mounted within the housing and independently of each other. At their outer ends the sleeve and shaft mount the respective arms 9 and 10 which are connected in any well known manner with the elements of a variable speed power transmitting mechanism, not shown, and at their inner ends within the housing 1 the sleeve and shaft mount the respective lever engaging forks 11 and 12, one positioned beneath each of the guide slots 2, and each provided on its inner face with a recess 13 for receiving the shifting lever, hereinafter described.

Fulcrumed at its lower end for free movement on the shaft 5 intermediate the forks 11 and 12 and projecting upwardly through the slots 2, is a shift lever 14 of any well known type capable of movement laterally between the spaced ends 4 of the fingers 3, to be received in recesses 13 of the respective lever engaging forks 11 and 12, the operation of said lever longitudinally of the slots 2 actuating the selected fork to operate the gear element associated therewith.

In this construction it is observed that the operation of the lever engaging forks controls the shifting of the gear elements, the lever being free to rotate relative to the shaft and sleeve and only engaging the forks when swung laterally from neutral position intermediate the meeting ends of the fingers 3.

The side wall of the housing 1 is formed adjacent the bearing 8 with a vertically disposed tubular bore 15 in which is rotatably mounted a locking bolt 16 having its lower face recessed as at 17. The lower end of the bolt 16 is received in a semi-circular groove 18 formed in both the shaft 5 and sleeve 7, and on the rotation of the bolt to cause said cutout or depression 17 to register with the depressions 18, the shaft and sleeve are capable of operative movement, but on the rotation of the bolt 16 to cause the solid portion thereof to be received in the depressions 18, said shaft and sleeve are locked from movement and the shifting of the gears by the operation of the lever is prevented.

Any well known type of lock mechanism for retaining the bolt 16 in its rotated position may be employed, the same being illustrated by a conventional form, as at 19.

It will be apparent that I have provided a mechanism for locking the sleeve and shaft which is concealed within the housing 1, and which is particularly adapted for a construction wherein the lever is capable of lateral movement on its fulcrum to engage the elements within the housing which are positively connected with the shiftable lever of the variable speed mechanism.

Having thus described my invention, what I claim as new and desire to protect by Letters Patent is:—

1. In combination with a concentrically disposed shaft and sleeve capable of independent rotation, a lever associated therewith and capable of movement for selectively operating said shaft and sleeve, a locking bolt coöperating with and capable of movement to intersect the axis of rotation of said shaft and sleeve to lock the same from movement, and lock controlled means associated with said bolt.

2. In combination with a pivotally mounted lever, lever engaging forks coöperating therewith for selective engagement and operation thereby, a housing inclosing said forks and through which said lever projects, a rotatable shaft mounting one of said forks, a rotatable sleeve mounting the other of said forks and disposed concentrically of the shaft, and lock controlled means intersecting the axis of rotation of said shaft and sleeve and capable of rotation to engage the same for locking said forks from operative movement.

3. In combination with a pivotally mounted lever, lever engaging forks coöperating therewith for selective engagement and operation thereby, a housing inclosing said forks and through which said lever projects, a rotatable shaft mounting one of said forks, a rotatable sleeve mounting the other of said forks and disposed concentrically of the shaft, and rotatable lock controlled means intersecting said sleeve and shaft to lock the same from rotation, said locking means and said sleeve and shaft each provided with a depression adapted when in register to permit of the rotation of said shaft and sleeve.

4. In combination with a pivotally mounted lever, lever engaging forks coöperating therewith for selective movement and operation thereby, a housing inclosing said forks and through which said lever projects, a rotatable shaft mounting one of said forks, a rotatable sleeve mounting the other of said forks and disposed concentrically of the shaft, said shaft and sleeve provided with registering depressions, a rotatable locking bolt disposed at an angle to said shaft and sleeve and extending into the depressions therein, said bolt provided with a depression capable of registering with said first mentioned depression on the rotation of the bolt, to permit free rotation of said shaft and sleeve, and lock controlled means for controlling the operation of said locking bolt.

In testimony whereof I have signed my name to this specification in the presence of a subscribing witness.

GEORGE C. JENSEN.

Witness:
D. B. RICHARDS.